US012611736B2

(12) United States Patent (10) Patent No.: US 12,611,736 B2
Ozaki et al. (45) Date of Patent: Apr. 28, 2026

(54) AUTOMATED WELDING SYSTEM, LEARNING DEVICE, NEURAL NETWORK SYSTEM, AND ESTIMATION DEVICE

(71) Applicant: KOBE STEEL, LTD., Hyogo (JP)

(72) Inventors: Keita Ozaki, Hyogo (JP); Akira Okamoto, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 918 days.

(21) Appl. No.: 17/904,158

(22) PCT Filed: Jan. 22, 2021

(86) PCT No.: PCT/JP2021/002346
§ 371 (c)(1),
(2) Date: Aug. 12, 2022

(87) PCT Pub. No.: WO2021/166555
PCT Pub. Date: Aug. 26, 2021

(65) Prior Publication Data
US 2023/0064432 A1 Mar. 2, 2023

(30) Foreign Application Priority Data
Feb. 17, 2020 (JP) ................................ 2020-024214

(51) Int. Cl.
*B23K 31/00* (2006.01)
*B23K 9/095* (2006.01)
(Continued)

(52) U.S. Cl.
CPC .......... *B23K 31/006* (2013.01); *B23K 9/0953* (2013.01); *B23K 9/0956* (2013.01);
(Continued)

(58) Field of Classification Search
CPC .. B23K 9/0956; B23K 9/0953; B23K 9/1087; B23K 9/1274; B23K 31/006; G06T 7/73
See application file for complete search history.

(56) References Cited

U.S. PATENT DOCUMENTS 9,892,339 B2 * 2/2018 Saklatvala ............. G06V 10/75
11,117,253 B2 * 9/2021 Oleynik ................. G05B 19/42
(Continued)

FOREIGN PATENT DOCUMENTS

CN 109712128 A 5/2019
JP 2017-006968 A 1/2017
JP 2018-192524 A 12/2018

OTHER PUBLICATIONS

Machine Translation of Okamoto et al (JP 2018-192524) performed on Jul. 30, 2025 (Year: 2018).*
(Continued)

*Primary Examiner* — Brian W Jennison
(74) *Attorney, Agent, or Firm* — Studebaker Brackett PLLC

(57) ABSTRACT

An automated welding system includes a camera for capturing a camera image of a molten pool and an arc generated in a groove by arc welding; an estimation unit for outputting a probability distribution image based on a camera image by using a learned model; an extraction unit for extracting a region having at least a predetermined probability from the probability distribution image; a selection unit for selecting a representative point corresponding to a feature point of an arc and a representative point corresponding to a feature point of a molten pool, in the region having at least the predetermined probability; and a correction unit for correcting a control parameter of a welding robot based on a positional relationship of the representative point corresponding to the feature point of the arc and the representa- (Continued)

100 1: WELDING SUPPORT DEVICE (ESTIMATION DEVICE)
10 — CONTROL UNIT
ACQUISITION UNIT — 11
2 ESTIMATION UNIT — 12
CAMERA EXTRACTION UNIT — 13
SELECTION UNIT — 14
CORRECTION UNIT — 15
5 DATABASE
LEARNED MODEL — 200
6: LEARNING DEVICE
60 — CONTROL UNIT
SETTING UNIT — 61
ACQUISITION UNIT — 62
LEARNING UNIT — 63
3
31 tive point corresponding to the feature point of the molten pool.

7 Claims, 11 Drawing Sheets

(51) Int. Cl.
    *B23K 9/10*           (2006.01)
    *B23K 9/127*      (2006.01)
    *G06T 7/73*       (2017.01)

(52) U.S. Cl.
    CPC .......... *B23K 9/1087* (2013.01); *B23K 9/1274* (2013.01); *G06T 7/73* (2017.01)

(56) References Cited

U.S. PATENT DOCUMENTS

| | | | |
|---|---|---|---|
| 11,247,288 B2 * | 2/2022 | Fujisawa | B25J 15/0019 |
| 11,633,812 B2 * | 4/2023 | Tanaka | B23K 26/707 |
| | | | 700/166 |

OTHER PUBLICATIONS

Machine Translation of Jiang et al (CN 109712128) performed on Jul. 30, 2025 (Year: 2019).*

The extended European search report issued by the European Patent Office on May 3, 2023, which corresponds to European Patent Application No. 21757687.5-1207 and is related to U.S. Appl. No. 17/904,158.

Bacioiu Daniel et al., "Automated defect classification of SS304 TIG welding process using visible spectrum camera and machine learning", NDT & E International, vol. 107, Jul. 6, 2019, pp. 1-9, Elsevier, Amsterdam, NL.

Ashida Tsuyoshi et al., "Development of Image Sensing Technology for Automatic Welding (Image Recognition by Deep Learning)"; KOBELCO Technology Review; Apr. 30, 2019; pp. 77-81; No. 37. Retrieved from the Internet: URL: https://www.kobelco.co.jp/english/ktr/pdf/ktr_37/077-081.pdf.

International Search Report issued in PCT/JP2021/002346; mailed Mar. 23, 2021.

Written Opinion of the International Searching Authority issued in PCT/JP2021/002346; mailed Mar. 23, 2021.

* cited by examiner

*FIG. 5*

| INPUT DATA | TEACHER DATA | | | | | | | | | | | |
|---|---|---|---|---|---|---|---|---|---|---|---|---|
| | UPPER PORTION OF TIP END OF MOLTEN POOL | | LOWER PORTION OF TIP END OF MOLTEN POOL | | CENTER OF ARC | | TIP END OF WIRE | | UPPER END OF MOLTEN POOL | | LOWER END OF MOLTEN POOL | |
| LEARNING IMAGE | Pool Lead Ux | VISIBLE | Pool Lead Dx | VISIBLE | Ark x | VISIBLE | Wire x | VISIBLE | Pool Uy | VISIBLE | Pool Dy | VISIBLE |
| aaaa | x, y, p<br>x, y, p<br>⋮ | ○ | x, y, p<br>x, y, p<br>⋮ | ○ | x, y, p<br>x, y, p<br>⋮ | ○ | x, y, p<br>x, y, p<br>⋮ | ○ | x, y, p<br>x, y, p<br>⋮ | ○ | x, y, p<br>x, y, p<br>⋮ | ○ |
| bbbb | x, y, p<br>x, y, p<br>⋮ | ○ | x, y, p<br>x, y, p<br>⋮ | — | x, y, p<br>x, y, p<br>⋮ | ○ | x, y, p<br>x, y, p<br>⋮ | ○ | x, y, p<br>x, y, p<br>⋮ | ○ | x, y, p<br>x, y, p<br>⋮ | ○ |
| cccc | x, y, p<br>x, y, p<br>⋮ | ○ | x, y, p<br>x, y, p<br>⋮ | ○ | x, y, p<br>x, y, p<br>⋮ | ○ | x, y, p<br>x, y, p<br>⋮ | — | x, y, p<br>x, y, p<br>⋮ | ○ | x, y, p<br>x, y, p<br>⋮ | ○ |
| dddd | x, y, p<br>x, y, p<br>⋮ | ○ | x, y, p<br>x, y, p<br>⋮ | ○ | x, y, p<br>x, y, p<br>⋮ | ○ | x, y, p<br>x, y, p<br>⋮ | ○ | x, y, p<br>x, y, p<br>⋮ | ○ | x, y, p<br>x, y, p<br>⋮ | ○ |

LEARNING PHASE

START

ACQUIRE DATA SET    ~S11

MACHINE LEARNING    ~S12

EVALUATE LEARNED MODEL    ~S13

STORE LEARNED MODEL    ~S14

END

AUTOMATED WELDING SYSTEM, LEARNING DEVICE, NEURAL NETWORK SYSTEM, AND ESTIMATION DEVICE

CROSS-REFERENCE TO RELATED APPLICATIONS

This application is a National Stage of International Patent Application No. PCT/JP2021/002346, filed Jan. 21, 2021, which claims benefit to Japanese Patent Application No. 2020-024214, filed Feb. 17, 2020, the entire contents of each are incorporated herein by reference.

BACKGROUND

Technical Field

The present disclosure relates to an automated welding system, a learning device, a neural network system, and an estimation device.

Background Art

JP-A-2017-6968 discloses that a tip end of a welding wire is moved along a groove while weaving between an upper end portion and a lower end portion of the groove, running of a welding torch is stopped in a process in which the tip end of the welding wire weaves from the lower end portion to the upper end portion of the groove, weaving of the tip end of the welding wire is stopped at the upper end portion of the groove, an amount of electric power for the welding wire is reduced while the welding torch runs, and a running speed of the welding torch, a weaving speed of the tip end of the welding wire, and an amount of electric power for the welding wire are increased in a process in which the tip end of the welding wire weaves from the upper end portion to the lower end portion of the groove.

SUMMARY

In order to control a welding robot by using an image obtained by imaging an arc and a molten pool generated by an arc welding, it is preferable to improve recognition accuracy of a feature point such as the center of the arc and a feature point such as a tip end of the molten pool.

Accordingly, the present disclosure provides an automated welding system, a learning device, a neural network system and an estimation device, that can improve recognition accuracy of a feature point in an image.

An automated welding system according to an aspect of the present disclosure includes a welding robot configured to perform an arc welding at a groove formed between two members to be welded; a camera configured to capture a camera image of a molten pool and an arc generated in the groove by the arc welding; and an estimation unit configured to output a probability distribution image based on the camera image using a learned model generated in advance by supervised learning so as to output the probability distribution image that indicates, when an image including a feature point is input, a probability of the feature point in each pixel and that includes a feature region in which a probability increases toward a position corresponding to the feature point, by using a learning image as input data and using region data indicating a region that includes a feature point in the learning image and has a probability distribution in which a probability increases toward the feature point as teacher data. The automated welding system further includes an extraction unit configured to extract a region having a probability equal to or higher than a predetermined probability from the probability distribution image; a selection unit configured to select a representative point corresponding to a feature point of the arc and a representative point corresponding to a feature point of the molten pool in the region having a probability equal to or higher than the predetermined probability; and a correction unit configured to correct a control parameter of the welding robot based on a positional relationship between the representative point corresponding to the feature point of the arc and the representative point corresponding to the feature point of the molten pool.

Further, a learning device according to another aspect of the present disclosure includes an acquisition unit configured to acquire a data set including a learning image and region data indicating a region that includes a feature point in the learning image and has a probability distribution in which a probability increases as the region comes close to the feature point; and a learning unit configured to generate a learned model by supervised learning so as to output a probability distribution image that indicates, when an image including the feature point is input, a probability of a feature point in each pixel and that includes a feature region in which a probability increases toward a position corresponding to the feature point, by using the learning image as input data and using the region data as teacher data. The learning image is an image obtained by capturing an image of a molten pool and an arc generated at a groove formed between two members to be welded by an arc welding, and the feature point includes a feature point of the arc and a feature point of the molten pool.

Further, a neural network system according to another aspect of the present disclosure causes a computer to output a probability distribution image that indicates a probability of a feature point in each pixel and includes a feature region in which a probability increases toward a position corresponding to the feature point, based on an input image including the feature point, the learned model including: a first convolution network including a convolution layer; a first deconvolution network including a convolution layer; a second convolution network including a pooling layer and a convolution layer; and a second deconvolution network including a convolution layer and an upsampling layer. The first convolution network performs a convolution processing on an input image and outputs a first feature image that is generated. The second convolution network performs a pooling processing on the first feature image, further performs a convolution processing, and outputs a second feature image that is generated. The second deconvolution network performs a deconvolution processing on the second feature image, further performs an upsampling processing, and outputs a third feature image that is generated. The first deconvolution network performs a deconvolution processing on a composite image obtained by combining the first feature image and the third feature image, and outputs an output image that is generated. The first convolution network, the first deconvolution network, the second convolution network, and the second deconvolution network perform learning so as to reduce a difference between a region that includes a feature point included in the input image and has a probability distribution in which a probability increases toward the feature point and a feature region included in the output image. The computer is configured to perform a calculation on the input image including the feature point based on the learned first convolution network, the first deconvolution network, the second convolution network, and the second deconvolution network and output a probability distribution image including a feature region in which a probability increases toward a position corresponding to the feature point.

Further, an estimation device according to another aspect of the present disclosure includes: an acquisition unit configured to acquire a camera image generated by a camera; and an estimation unit configured to output a probability distribution image based on the camera image by using a learned model generated in advance by supervised learning so as to output the probability distribution image that indicates, when an image including the feature point is input, a probability of a feature point in each pixel and that includes a feature region in which a probability increases toward a position corresponding to the feature point by using a learning image as input data and using region data including a feature point in the learning image and indicating a region that has a probability distribution in which a probability increases toward the feature point as teacher data. The estimation device further includes an extraction unit configured to extract a region having a probability equal to or higher than a predetermined probability from the probability distribution image; and a selection unit configured to select a representative point in the region having a probability equal to or higher than the predetermined probability.

According to the present disclosure, it is possible to improve recognition accuracy of a feature point in an image.

BRIEF DESCRIPTION OF THE DRAWINGS

FIG. 5 is a diagram showing an example of a data set used in a learning phase;

DETAILED DESCRIPTION

Hereinafter, embodiments of the present disclosure will be described with reference to the drawings.

[System Overview]

Figure 1:
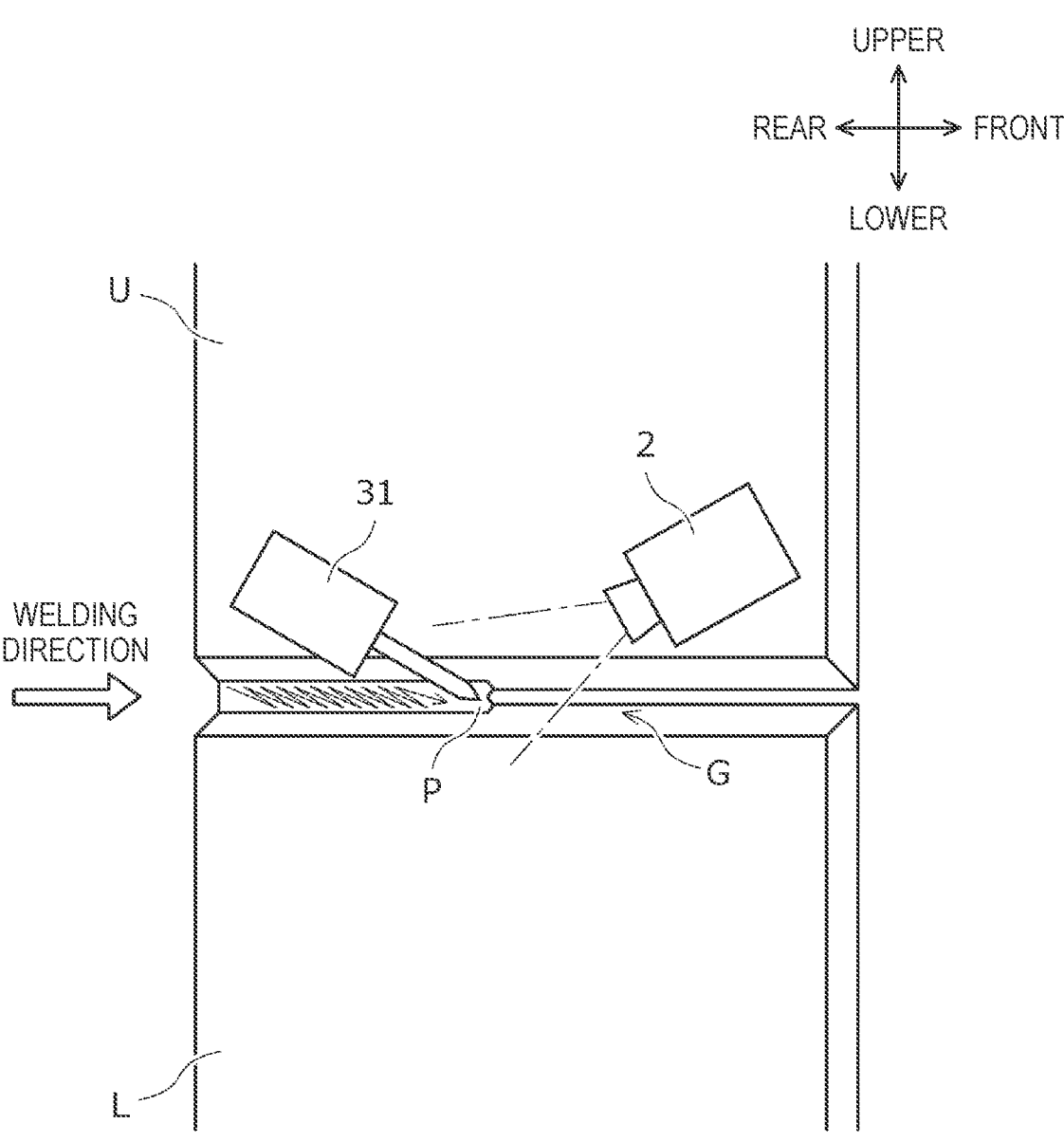
FIG. 1 is a diagram showing an example of a welding performed by an automated welding system.
Figure 2:
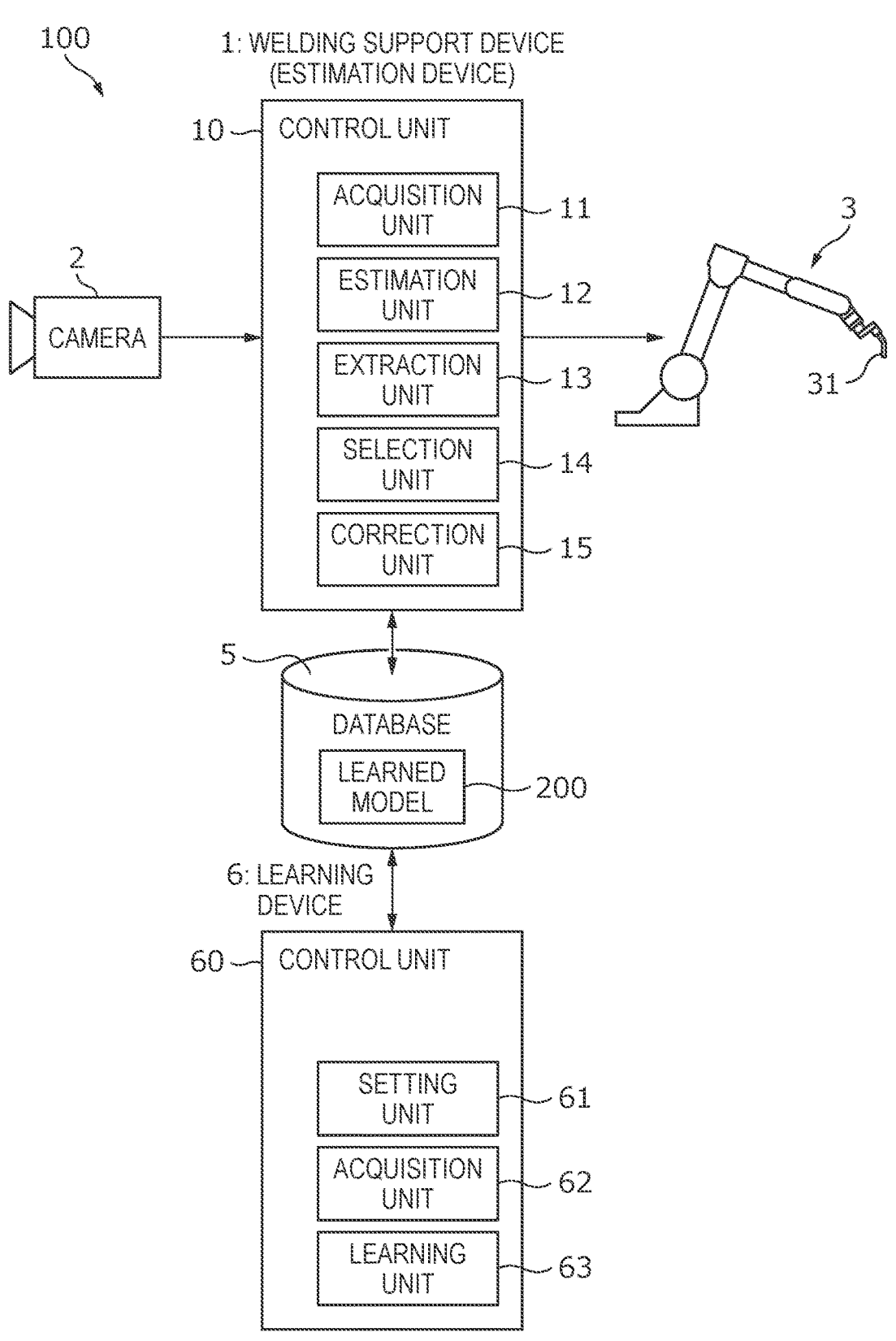
FIG. 2 is a diagram showing a configuration example of the automated welding system.

FIG. 1 is a diagram showing an example of a welding performed by a welding robot 3 of an automated welding system 100. FIG. 2 is a diagram showing a configuration example of the automated welding system 100.

As shown in FIG. 1, the welding robot 3 performs an arc welding while advancing a welding torch 31 at a groove G formed between two members to be welded U and L. A molten pool P is formed in the vicinity of a tip end portion of the welding torch 31.

In the present embodiment, the members to be welded U and L are arranged in a vertical direction (an upper-lower direction), and the groove G extends in a horizontal direction (a front-rear direction). The present disclosure is not limited thereto, and the members to be welded U and L may be arranged in the horizontal direction.

An interval between the members to be welded U and L (that is, a width of the groove G) is, for example, about 3 mm to 10 mm A backing material may be attached to the members to be welded U and L or the members to be welded U and L may not be attached with a backing material. A shape of the groove G is not limited to a V shape shown in the drawings, and may be an X shape or the like.

For example, a Tungsten Inert Gas (TIG) welding is applied to the arc welding. The present disclosure is not limited thereto, and a Metal Inert Gas (MIG) welding, a Metal Active Gas (MAG) welding, or the like may be applied.

The welding robot 3 performs an arc welding while the welding torch 31 weaves. When the members to be welded U and L are arranged in the upper-lower direction and a welding direction is a forward direction, the welding torch 31 weaves in a front lower to rear upper direction in order to prevent dripping of the molten pool P.

A camera 2 captures an image of an arc and the molten pool P generated at the tip end portion of the welding torch 31 and forms an image. The camera 2 also captures an image of a wire (a filler metal) (not shown) fed toward the arc.

The camera 2 is disposed in a forward direction relative to the welding torch 31, and moves in the forward direction together with the welding torch 31. A lens of the camera 2 is equipped with a band-pass filter that transmits only near-infrared light near 950 nm in order to prevent incidence of arc light.

The camera 2 is a video camera that generates a moving image including a plurality of time-series still images (frames). The camera 2 is not limited thereto, and may be a still camera that generates a plurality of time-series still images by periodical imaging.

As shown in FIG. 2, the automated welding system 100 includes a welding support device 1, the camera 2, the welding robot 3, a database 5, and a learning device 6. These devices can communicate with one another via a communication network such as the Internet or a LAN. The welding support device 1 is an example of an estimation device.

The welding support device 1 includes a control unit 10. The control unit 10 is a computer including a central processing unit (CPU), a random access memory (RAM), a read only memory (ROM), a nonvolatile memory, an input/output interface, and the like. The CPU of the control unit 10 executes an information processing in accordance with a program loaded from the ROM or the nonvolatile memory to the RAM.

The control unit 10 includes an acquisition unit 11, an estimation unit 12, an extraction unit 13, a selection unit 14, and a correction unit 15. These functional units are implemented by the CPU of the control unit 10 executing an information processing in accordance with a program loaded from the ROM or the nonvolatile memory to the RAM.

The program may be supplied via an information storage medium such as an optical disk or a memory card, or may be supplied via a communication network such as the Internet or a LAN.

The learning device 6 also includes a control unit 60 in a similar manner to the welding support device 1. The control unit 60 includes a setting unit 61, an acquisition unit 62, and a learning unit 63. The learning device 6 may be implemented by one or a plurality of server computers.

The welding support device 1 and the learning device 6 can access the database 5. In the database 5, a learned model 200 constructed by the learning device 6 is stored so as to be readable by the welding support device 1.

Figure 3:
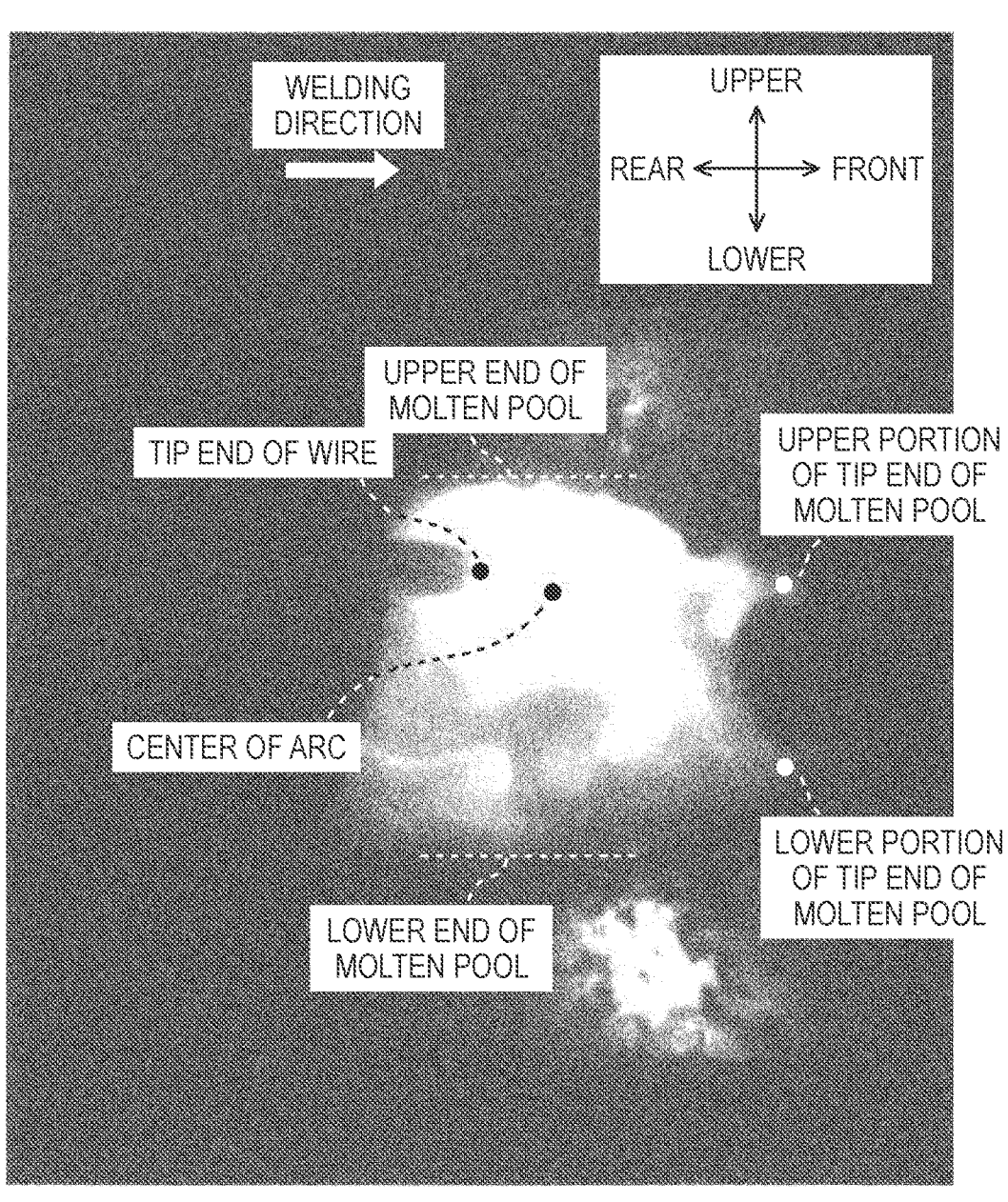
FIG. 3 is a diagram showing an example of an image of an arc and a molten pool.
Figure 4:
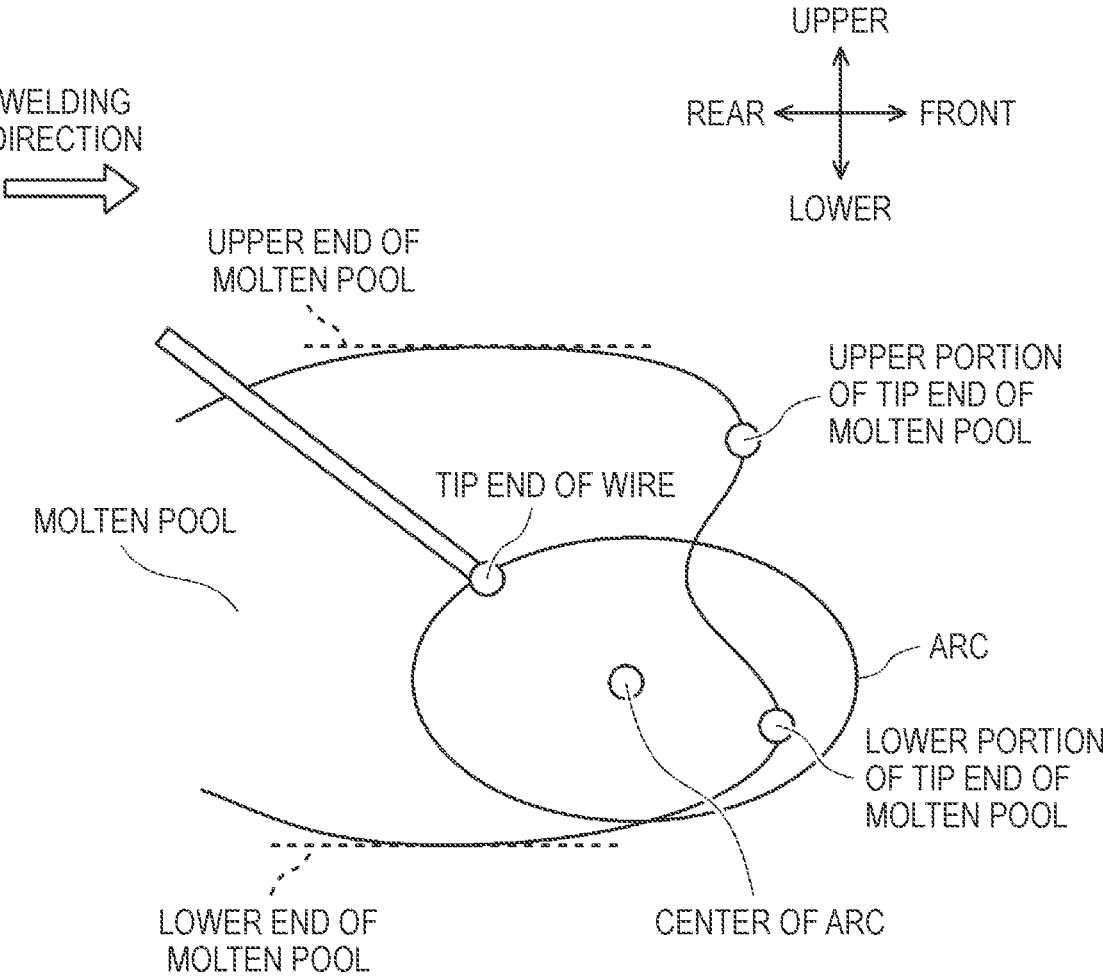
FIG. 4 is a diagram schematically showing a specific example of the arc and the molten pool.

FIG. 3 is a diagram showing an example of an image of an arc and a molten pool. FIG. 4 is a diagram schematically showing the arc and the molten pool. As shown in FIGS. 3 and 4, the image includes six feature points of an upper portion of a tip end of the molten pool, a lower portion of the tip end of the molten pool, a center of the arc, a tip end of a wire, an upper end of the molten pool, and a lower end of the molten pool.

When the welding torch moves before or behind the molten pool, a welding defect may occur, and therefore it is important to maintain the welding torch at an appropriate position relative to the molten pool.

Since a groove width or a welding line may deviate from a design value due to various influences such as a welding distortion and a mounting error and a degree of accumulation of the molten pool may change due to these influences, it is not easy to maintain the welding torch at an appropriate position relative to the molten pool.

The welding torch can be maintained at an appropriate position relative to the molten pool in the present embodiment by correcting a control parameter of the welding robot 3 based on camera images captured by the camera 2, as will be described below.

[Learning Phase]

FIG. 5 is a diagram showing an example of a data set used in a learning phase. The data set includes input data and teacher data. The input data is a learning image. The learning image may be, for example, an image captured by the camera 2 or an image captured by another camera.

The teacher data includes region data of a feature region set for each feature point in the learning image. The feature region is a region that includes a feature point and has a probability distribution in which a probability increases toward the feature point. Specifically, the region data includes coordinates and a probability of each pixel included in the feature region. The probability represents an existence probability of a feature point.

Furthermore, the teacher data may include a visible flag indicating whether a feature point is visible in the learning image. Some feature points such as the upper portion of the tip end of the molten pool, the lower portion of the tip end of the molten pool, and the tip end of the wire may be invisible due to the weaving of the welding torch 31. That is, some feature points may be hidden by the welding torch 31.

Figure 6:
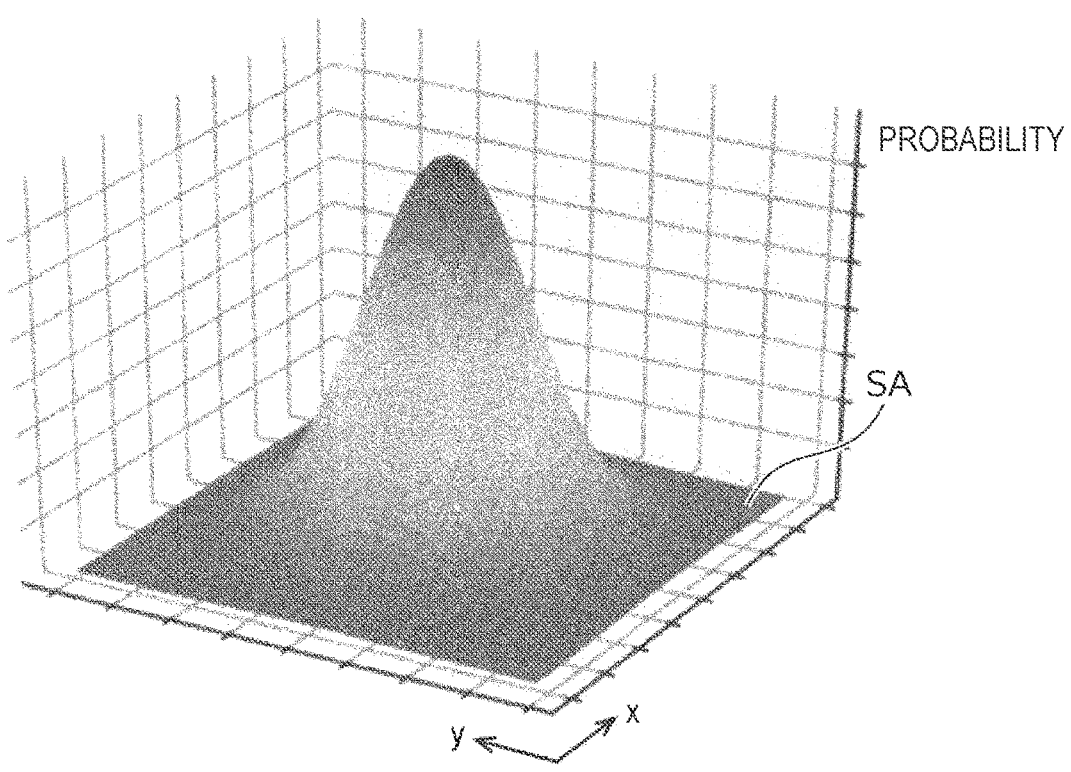
FIG. 6 is a diagram showing an example of a feature region.
Figure 7:
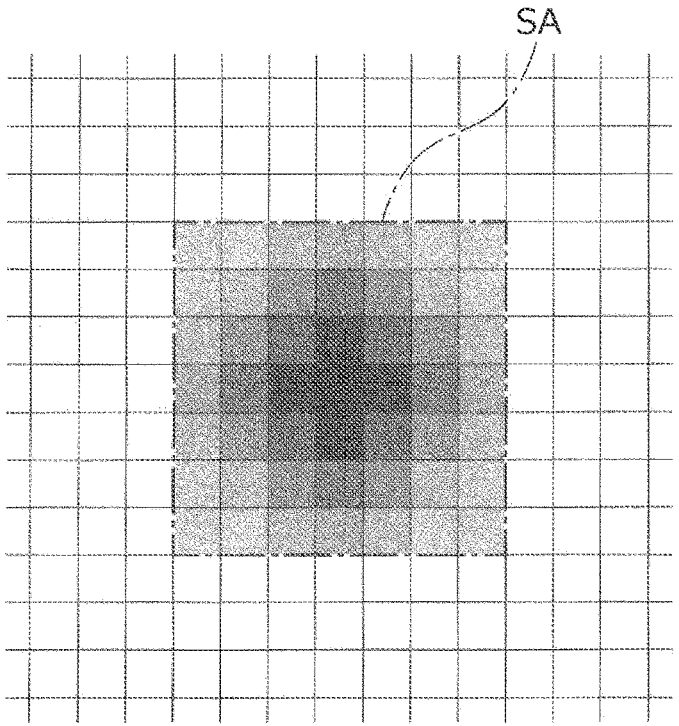
FIG. 7 is a diagram showing an example of a feature region.
Figure 8:
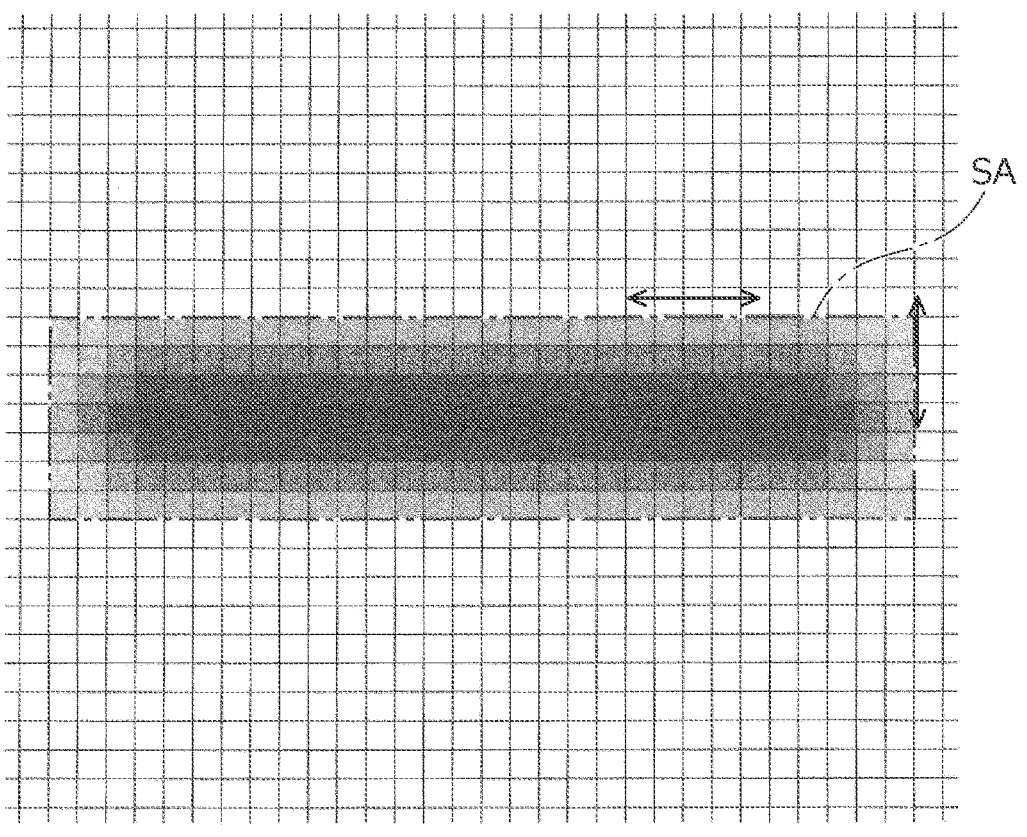
FIG. 8 is a diagram showing an example of a feature region.

FIGS. 6 to 8 are diagrams showing examples of a feature region SA indicated by the region data. In FIG. 6, an axis orthogonal to an xy axis representing coordinates of a pixel represents a probability. In FIGS. 7 and 8, a color density of a pixel represents a probability.

The feature region SA is a region of a predetermined size having a two-dimensional spread around a feature point, and has a probability distribution in which the probability increases toward the feature point. The feature region SA has, for example, a probability distribution according to a two-dimensional normal distribution.

The probability may be normalized so that the entire feature region SA is 1, or may have a value of 0 to 1 for each pixel of the feature region SA.

As shown in FIG. 7, when a feature point is a point, the feature region SA is a square region (for example, 7×7 pixels). As shown in FIG. 8, when a feature point is a line, the feature region SA is a rectangular region (for example, 7×35 pixels). The feature region SA is not limited to thereto, and may have, for example, a substantially circular shape.

For example, among the six feature points shown in FIGS. 3 and 4, the upper portion of the tip end of the molten pool, the lower portion of the tip end of the molten pool, the center of the arc, and the tip end of the wire are feature points of a "point", and the square feature region SA is set. On the other hand, the upper end of the molten pool and the lower end of the molten pool are feature points of a "line", and the rectangular feature region SA is set.

A position of each feature point is determined by, for example, a person such as a skilled person who views a learning image, and is input to the learning device 6 using a pointing device or the like. The learning device 6 may set the feature region SA with reference to the position of the input feature point and store the feature region SA as teacher data (a processing of the setting unit 61).

Figure 9:
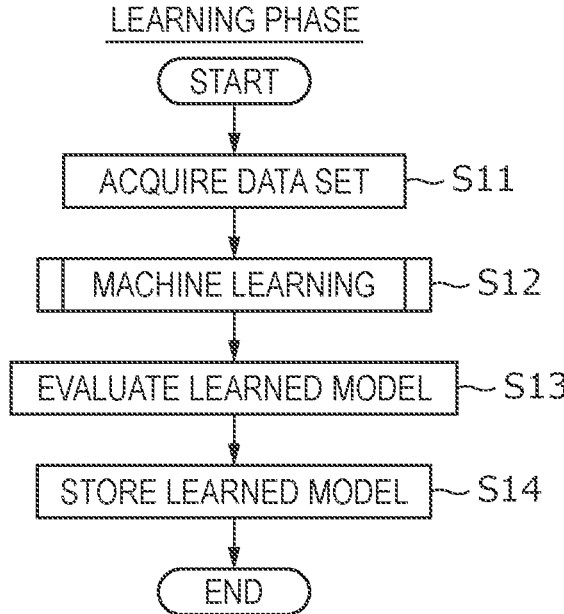
FIG. 9 is a diagram showing a procedure example of the learning phase.

FIG. 9 is a diagram showing a procedure example of a learning phase serving as a method for generating a learned model that is implemented in the learning device 6. The control unit 60 of the learning device 6 functions as the acquisition unit 62 and the learning unit 63 by executing a processing shown in the drawing in accordance with a program.

First, the control unit 60 acquires a data set including a learning image, region data of a feature region set for each feature point in the learning image, and a visible flag of each feature point (S11: a processing of the acquisition unit 62, see FIG. 5).

Next, the control unit 60 executes machine learning using a part of the data set as learning data (S12: a processing of the learning unit 63). A specific procedure example of a machine learning processing S12 will be described later.

Thereafter, the control unit 60 evaluates the learned model 200 by using a part of the data set other than the learning data as test data (S13), and stores the learned model 200 in the database 5 (S14).

Figure 10:
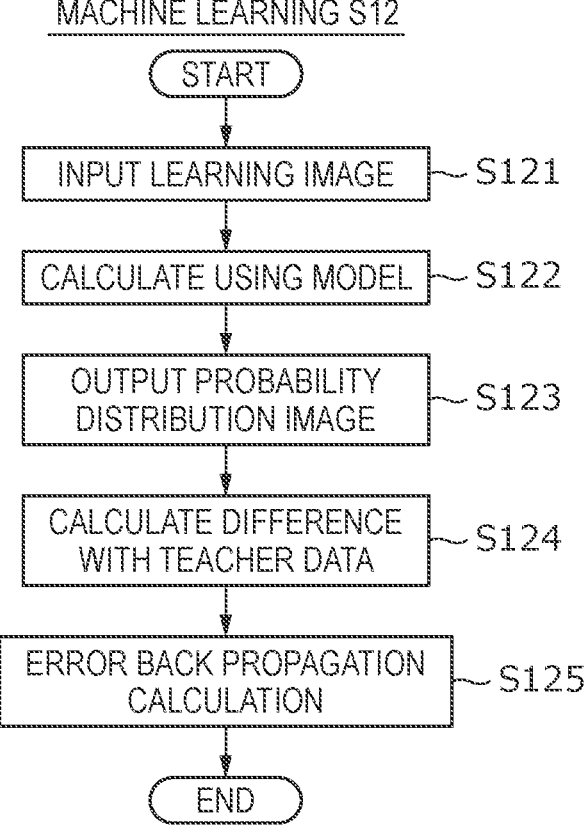
FIG. 10 is a diagram showing a procedure example of a machine learning processing.
Figure 11:
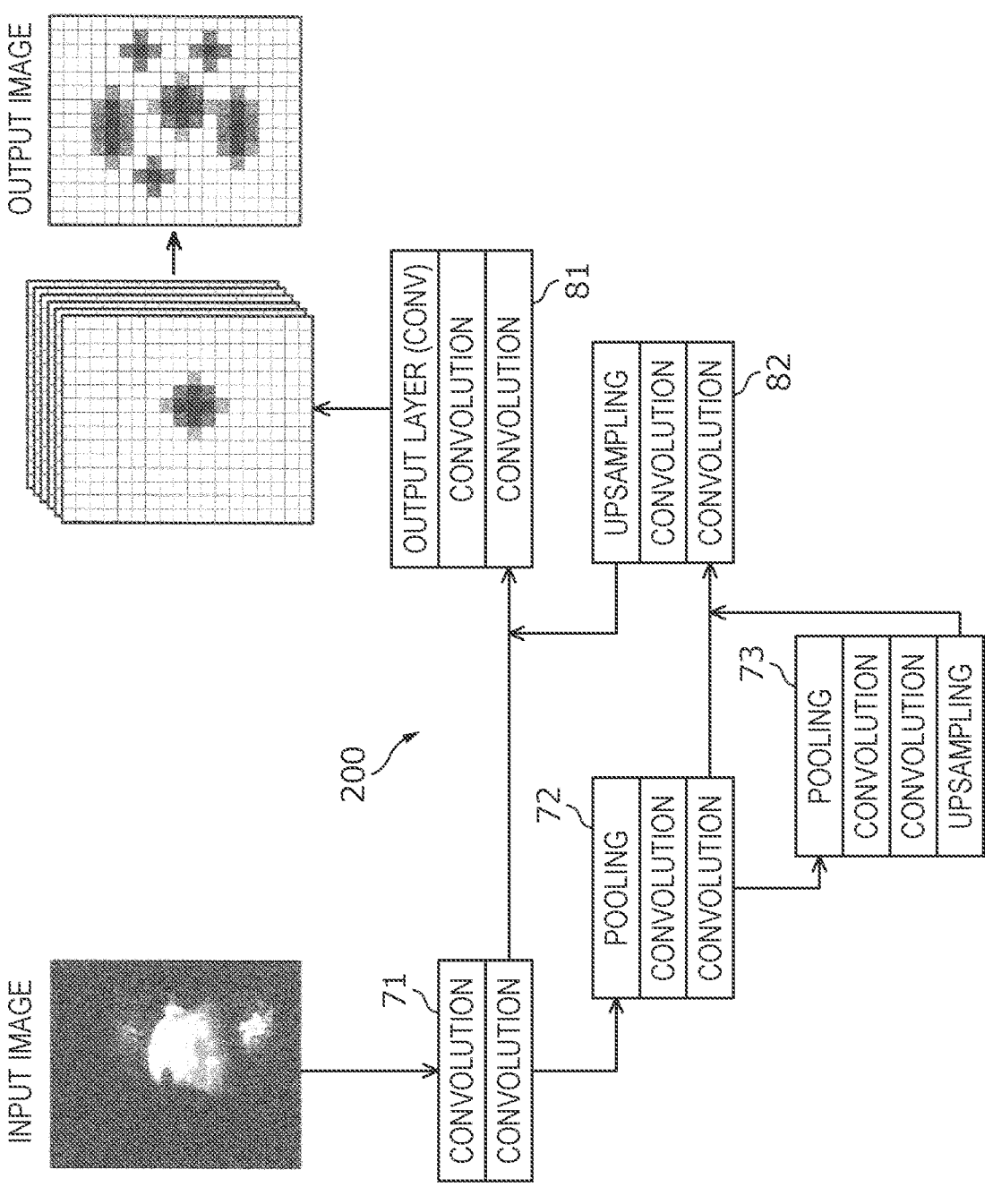
FIG. 11 is a diagram showing a configuration example of a learned model.

FIG. 10 is a diagram showing a specific procedure example of the machine learning processing S12. FIG. 11 is a diagram showing a configuration example of the learned model 200 generated by the machine learning processing S12.

The control unit 60 of the learning device 6 generates the learned model 200 by supervised learning so as to output a probability distribution image by using the learning image as input data and using region data of a feature region set for each feature point in the learning image and a visible flag of each feature point as teacher data.

The probability distribution image is an image (map) indicating a probability of a feature point in each pixel. Similar to the feature region set in the learning image, a feature region included in the probability distribution image has a probability distribution in which the probability increases toward a position corresponding to a feature point.

The probability distribution image includes a feature region corresponding to each of the plurality of feature points. Specifically, the probability distribution image includes six feature regions respectively corresponding to the upper portion of the tip end of the molten pool, the lower portion of the tip end of the molten pool, the center of the arc, the tip end of the wire, the upper end of the molten pool, and the lower end of the molten pool.

When the visible flag indicates that a feature point is invisible, the probability distribution image does not include a feature region corresponding to the feature point. That is, the probability of the feature point is 0 over all pixels. For example, when the upper portion of the tip end of the molten pool is invisible, the probability distribution image does not include a feature region corresponding to the upper portion of the tip end of the molten pool.

As shown in FIG. 10, in the machine learning processing S12, the control unit 60 inputs a learning image to a model, executes a calculation using the model, and outputs a probability distribution image (S121 to S123).

Next, the control unit 60 calculates a difference between a feature region included in the probability distribution image output from the model and a feature region indicated by the region data that is the teacher data (S124), and executes an error back propagation calculation so as to reduce the difference (S125).

As shown in FIG. 11, the learned model 200 includes a first convolution network 71, a second convolution network 72, a third convolution network 73, a first deconvolution network 81, and a second deconvolution network 82.

The learned model 200 applies a semantic segmentation technique using a completely convolution network.

The first convolution network 71 includes a convolution layer, executes a convolution processing on an input image, and outputs a generated feature image (feature map) to the first deconvolution network 81 and the second convolution network 72.

The second convolution network 72 includes a pooling layer and a convolution layer, executes a pooling processing on the feature image from the first convolution network 71, further executes a convolution processing, and outputs a generated feature image to the second deconvolution network 82 and the third convolution network 73.

The third convolution network 73 includes a pooling layer, a convolution layer, and an upsampling layer, and executes a pooling processing on the feature image from the second convolution network 72, further executes a convolution processing, furthermore executes an upsampling processing, and outputs a generated feature image to the second deconvolution network 82.

The second deconvolution network 82 includes a convolution layer and an upsampling layer, executes a deconvolution processing on a composite image obtained by combining the feature image from the second convolution network 72 and the feature image from the third convolution network 73, further executes an upsampling processing, and outputs a generated feature image to the first deconvolution network 81.

The first deconvolution network 81 includes a convolution layer and an output layer, and executes a deconvolution processing on a composite image obtained by combining the feature image from the first convolution network 71 and the feature image from the second deconvolution network 82, and outputs a generated probability distribution image.

Specifically, a probability distribution image for each type of a feature point (for each label) is generated, and one probability distribution image is generated by combining these probability distribution images. For example, a probability distribution image is generated for each of the six feature points, that is, the upper portion of the tip end of the molten pool, the lower portion of the tip end of the molten pool, the center of the arc, the tip end of the wire, the upper end of the molten pool, and the lower end of the molten pool, and these feature points are combined to obtain a probability distribution image including six feature regions corresponding to the six feature points.

The first convolution network 71, the second convolution network 72, the third convolution network 73, the first deconvolution network 81, and the second deconvolution network 82 are learned by the error back propagation calculation so as to reduce a difference between a feature region set in the learning image (the input image) and a feature region included in the probability distribution image (the output image).

The control unit of the welding support device 1 outputs the probability distribution image including the feature regions corresponding to the feature points by executing a calculation on an image including the feature points based on the learned model 200 (the first convolution network 71, the second convolution network 72, the third convolution network 73, the first deconvolution network 81, and the second deconvolution network 82) learned as described above.

In the learned model 200 according to the present embodiment, a plurality of stages of convolution networks 71 to 73 and deconvolution networks 81 and 82 are provided, and a deconvolution processing is executed on a composite image. Accordingly, it is possible to output a probability distribution image including a feature region in which a probability increases toward a position corresponding to a feature point.

A configuration of the learned model 200 is not limited to the shown contents. For example, the number of convolution layers included in each network is not limited to two, and may be one or three or more. In addition, the number of stages of the network is not limited to three, and may be two, or four or more.

[Inference Phase]

Figure 12:
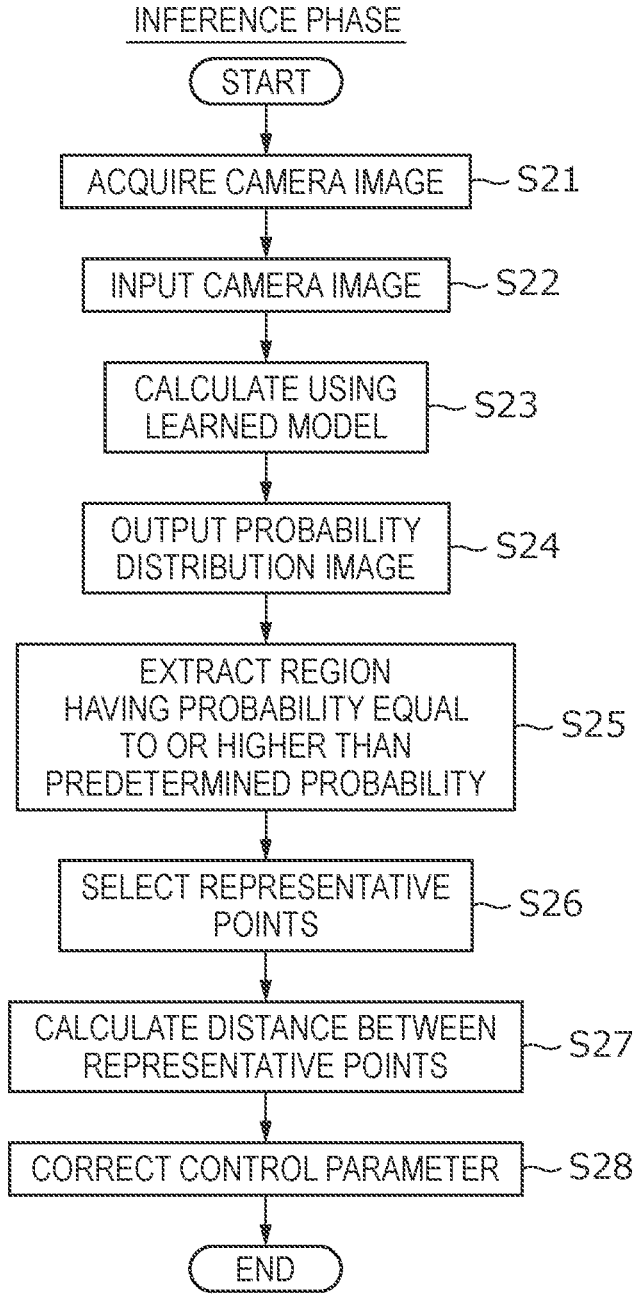
FIG. 12 is a diagram showing a procedure example of an inference phase.

FIG. 12 is a diagram showing a procedure example of an inference phase serving as an automated welding method according to the embodiment which is implemented in the welding support device (the estimation device) 1. The control unit 10 of the welding support device 1 functions as the acquisition unit 11, the estimation unit 12, the extraction unit 13, the selection unit 14, and the correction unit 15 by executing the processing shown in the drawing according to a program.

First, the control unit 10 acquires camera images from the camera 2 (S21: a processing of the acquisition unit 11). Specifically, the control unit 10 sequentially acquires, as the camera images, a plurality of time-series still images (frames) included in a moving image generated by the camera 2.

Next, the control unit 10 inputs the camera images to the learned model 200 generated in the learning phase, executes a calculation, and outputs a probability distribution image based on the camera images (S22 to S24: a processing of the estimation unit 12). Specifically, the control unit 10 sequentially inputs the plurality of time-series camera images to the learned model 200, and sequentially outputs probability distribution images.

Next, the control unit 10 extracts a region having a probability equal to or higher than a predetermined probability from the probability distribution image (S25: a processing of the extraction unit 13), and selects a representative point in the region having a probability equal to or higher than the predetermined probability (S26; a processing of the selection unit 14).

Specifically, the control unit 10 determines whether a value of the probability stored in each pixel of the probability distribution image is equal to or higher than a threshold, and extracts a region in which pixels having a probability value equal to or higher than the threshold are aggregated. The threshold used here is set in advance and is stored in a storage device such as a ROM. Further, the control unit 10 selects a pixel having a maximum probability value in the extracted region as a representative point.

Alternatively, the control unit 10 may set, as coordinates of the representative point, coordinates obtained by weighted averaging coordinates of each pixel included in the extracted region with a probability value (the following formula).

$$X = \frac{\sum_{i=1}^{N} (x_i \times p_i)}{\sum_{i=1}^{N} p_i}$$ [Formula 1]

X represents weighted average coordinates, N represents a total number of pixels having a probability value equal to or higher than the threshold, x represents pixel coordinates, and p represents a probability value.

In this manner, representative points corresponding to feature points included in a camera image are specified by extracting the region having a probability equal to or higher than a predetermined probability from the probability distribution image and selecting the representative points. That is, the representative points corresponding to the upper portion of the tip end of the molten pool, the lower portion of the tip end of the molten pool, the center of the arc, the tip end of the wire, the upper end of the molten pool, and the lower end are specified.

Next, the control unit 10 calculates a distance between representative points (S27). For example, a distance between the representative point corresponding to the upper portion or the lower portion of the tip end of the molten pool and the representative point corresponding to the center of the arc, a distance between the representative point corresponding to the upper end or the lower end of the molten pool and the representative point corresponding to the center of the arc, a distance between the representative point corresponding to the upper end of the molten pool and the representative point corresponding to the lower end of the molten pool, and the like are calculated.

Next, the control unit 10 corrects a control parameter of the welding robot 3 (see FIG. 2) based on a positional relationship of the representative points (S28: a processing of the correction unit 15). Specifically, when the control unit 10 calculates a correction amount of the control parameter and transmits the correction amount to the welding robot 3, the control unit of the welding robot 3 corrects the control parameter using the received correction amount.

The control parameter to be corrected is, for example, a speed or a position of the welding torch 31 in a welding direction (the front-rear direction in FIG. 1), a position of the welding torch 31 in a groove width direction (the upper-lower direction in FIG. 1), or a weaving width. The present disclosure is not limited thereto, and a command value of an actuator of the welding robot 3 or the like may be directly corrected.

For example, when the distance between the representative point corresponding to the upper portion or the lower portion of the tip end of the molten pool and the representative point corresponding to the center of the arc deviates from a predetermined reference value, the control unit 10 calculates a correction amount of the speed or the position of the welding torch 31 in the welding direction so as to bring the distance close to the reference value.

When the distance between the representative point corresponding to the upper end or the lower end of the molten pool and the representative point corresponding to the center of the arc deviates from a predetermined reference value, the control unit 10 may calculate a correction amount of the position of the welding torch 31 in the groove width direction so as to bring the distance close to the reference value.

In a case where the distance periodically changes due to weaving of the welding torch 31, a correction amount is calculated when the periodically changing distance has a minimum value or has a value close to a maximum value.

The control unit 10 may calculate a correction amount of the weaving width such that the weaving width of the welding torch 31 increases or decreases in accordance with an increase or a decrease in the distance between the representative point corresponding to the upper end of the molten pool and the representative point corresponding to the lower end of the molten pool (that is, a width of the molten pool).

As described above, it is possible to maintain the welding torch 31 at an appropriate position relative to the molten pool P and achieve a high-quality automated welding by correcting the control parameter of the welding robot 3.

According to the present embodiment, it is possible to improve recognition accuracy of a feature point by outputting a probability distribution image using a learned model, extracting a region having a probability equal to or higher than a predetermined probability from the probability distribution image, and selecting a representative point.

Figure 13:
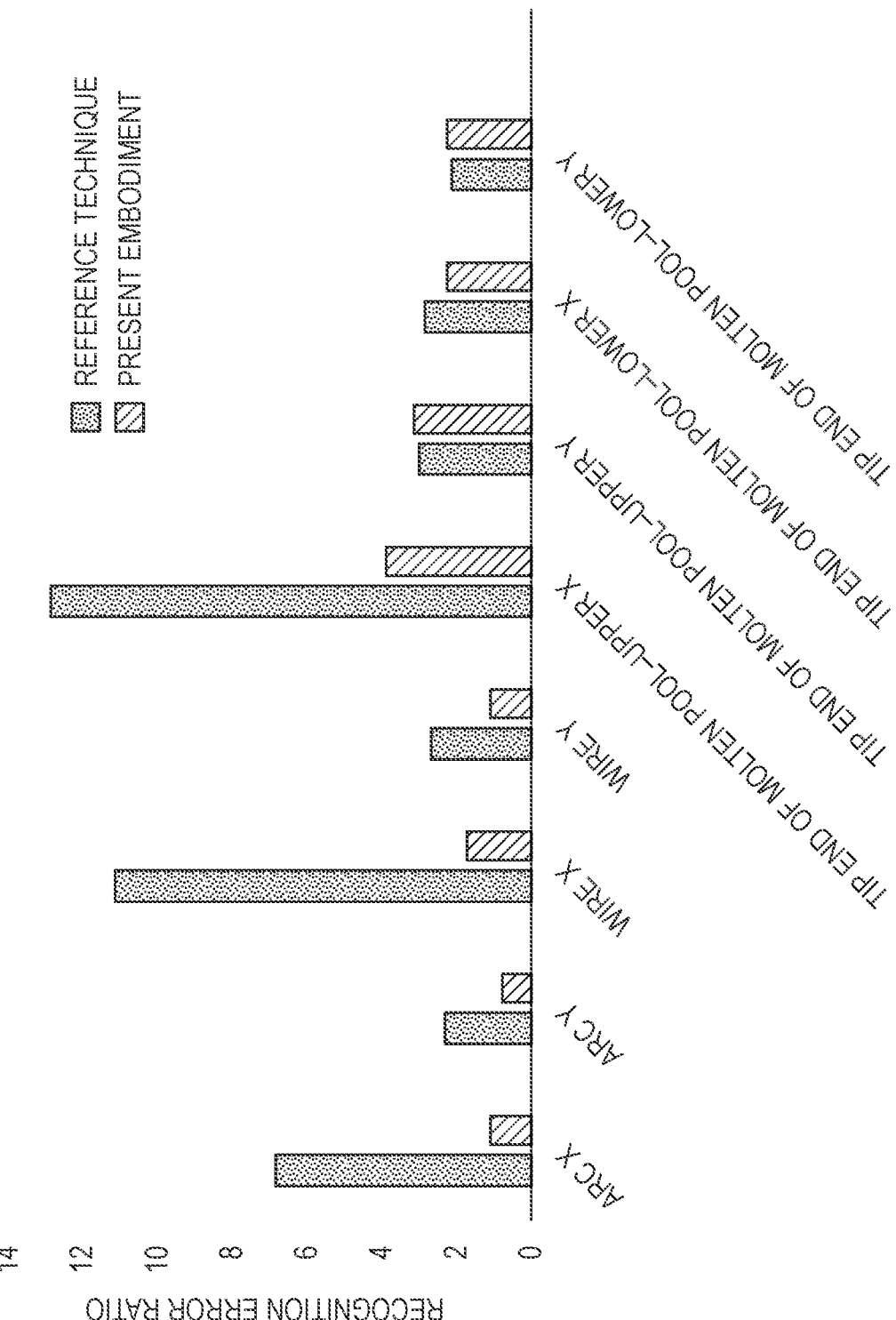
FIG. 13 is a diagram showing recognition accuracy according to an embodiment.

FIG. 13 is a diagram showing recognition accuracy of feature points according to the present embodiment. FIG. 13 shows a result of evaluating recognition performance of feature points in a camera image (an unknown image not included in a learning data set) obtained by imaging at an angle different from an angle of the learning image.

A vertical axis represents a recognition error. In a horizontal axis, X represents the front-rear direction, and Y represents the upper-lower direction. The reference technique is a technique for recognizing feature points in an image using a learned model that directly outputs coordinates of the feature points.

According to FIG. 13, it can be found that recognition errors (in particular, recognition errors in the front-rear direction) of the center of the arc, the tip end of the wire, and the upper portion of the tip end of the molten pool are reduced in the present embodiment as compared with the reference technique.

That is, the recognition accuracy is not sufficient for the camera image obtained by imaging at an angle different from an angle of the learning image in the reference technique, while it is possible to ensure the recognition accuracy for such a camera image in the present embodiment.

Although the embodiment of the present disclosure has been described above, the present disclosure is not limited to the embodiment described above, and it is needless to say that various modifications can be made by those skilled in the art.

The present disclosure can be applied not only to the field of welding but also to various fields using a processing of recognizing feature points in an image.

Although various embodiments have been described above with reference to the drawings, it is needless to say that the present disclosure is not limited to these examples. It will be apparent to those skilled in the art that various changes and modifications may be conceived within the scope of the claims. It is also understood that the various changes and modifications belong to the technical scope of the present disclosure. Components in the embodiments described above may be combined freely within a range not departing from the spirit of the present disclosure.

What is claimed is:

1. An automated welding system comprising:

a welding robot configured to perform an arc welding at a groove formed between two members to be welded;

a camera configured to capture a camera image of a molten pool and an arc generated in the groove by the arc welding; and a welding support device including:

a memory configured to store a computer-readable program which, when executed, causes the welding support device to perform a method of controlling the welding robot to perform the arc welding at the groove; and a processor which, when executing the computer-readable program, is configured to control the welding support device to perform the method of controlling the welding robot to perform the arc welding at the groove, wherein the method of controlling the welding robot to perform the arc welding at the groove includes:

determining a probability distribution image based on the camera image using a learned model generated in advance by supervised learning so as to output the probability distribution image that indicates, when an image including a feature point is input, a probability of the feature point in each pixel and that includes a feature region in which a probability increases toward a position corresponding to the feature point, by using a learning image as input data and using region data indicating a region that includes a feature point in the learning image and has a probability distribution in which a probability increases toward the feature point as teacher data;

extracting a region having a probability equal to or higher than a predetermined probability from the probability distribution image;

selecting a representative point corresponding to a feature point of the arc and a representative point corresponding to a feature point of the molten pool in the region having a probability equal to or higher than the predetermined probability; and determining a control parameter of the welding robot based on a positional relationship between the representative point corresponding to the feature point of the arc and the representative point corresponding to the feature point of the molten pool.

2. A learning device comprising:

a memory configured to store a computer-readable program which, when executed, causes the learning device to generate a trained model for controlling a welding robot to perform arc welding at a groove; and a processor which, when executing the computer-readable program, is configured to control the learning device to perform a method of generating the trained model for controlling the welding robot to perform the arc welding at the groove, wherein the method of generating the trained model includes:

acquiring a data set including a learning image and region data indicating a region that includes a feature point in the learning image and has a probability distribution in which a probability increases as the region comes close to the feature point; and generating a learned model by supervised learning so as to output a probability distribution image that indicates, when an image including the feature point is input, a probability of a feature point in each pixel and that includes a feature region in which a probability increases toward a position corresponding to the feature point, by using the learning image as input data and using the region data as teacher data, wherein the learning image is an image obtained by capturing an image of a molten pool and an arc generated at a groove formed between two members to be welded by an arc welding, and wherein the feature point includes a feature point of the arc and a feature point of the molten pool.

3. A neural network system for causing a computer to output a probability distribution image that indicates a probability of a feature point in each pixel and includes a feature region in which a probability increases toward a position corresponding to the feature point, based on an input image including the feature point, the neural network system comprising:

a first convolution network including a convolution layer;

a first deconvolution network including a convolution layer;

a second convolution network including a pooling layer and a convolution layer; and a second deconvolution network including a convolution layer and an upsampling layer, wherein the first convolution network performs a convolution processing on an input image and outputs a first feature image that is generated, wherein the second convolution network performs a pooling processing on the first feature image, further performs a convolution processing, and outputs a second feature image that is generated, wherein the second deconvolution network performs a deconvolution processing on the second feature image, further performs an upsampling processing, and outputs a third feature image that is generated, wherein the first deconvolution network performs a deconvolution processing on a composite image obtained by combining the first feature image and the third feature image, and outputs an output image that is generated, wherein the first convolution network, the first deconvolution network, the second convolution network, and the second deconvolution network perform learning so as to reduce a difference between a region that includes a feature point included in the input image and has a probability distribution in which a probability increases toward the feature point and a feature region included in the output image, and wherein the computer is configured to perform a calculation on the input image including the feature point based on the learned first convolution network, the first deconvolution network, the second convolution network, and the second deconvolution network and output a probability distribution image including a feature region in which a probability increases toward a position corresponding to the feature point.

4. The neural network system according to claim 3, further comprising:

a third convolution network including a pooling layer, a convolution layer, and an upsampling layer, wherein the third convolution network performs a pooling processing on the second feature image from the second convolution network, further performs a convolution processing, furthermore performs an upsampling processing, and outputs a fourth feature image that is generated, and wherein the second deconvolution network performs a deconvolution processing on a composite image obtained by combining the second feature image and the fourth feature image, further performs an upsampling processing, and outputs the third feature image.

5. A welding support device comprising:

a memory configured to store a computer-readable program which, when executed, causes the welding support device to perform a method of controlling a welding robot to perform arc welding at a groove; and a processor which, when executing the computer-readable program, is configured to control the welding support device to perform the method of controlling the welding robot to perform the arc welding at the groove, wherein the method of controlling the welding robot to perform the arc welding at the groove includes:

acquiring a camera image generated by a camera;

determining a probability distribution image based on the camera image by using a learned model generated in advance by supervised learning so as to output the probability distribution image that indicates, when an image including a feature point is input, a probability of a feature point in each pixel and that includes a feature region in which a probability increases toward a position corresponding to the feature point by using a learning image as input data and using region data including a feature point in the learning image and indicating a region that has a probability distribution in which a probability increases toward the feature point as teacher data;

extracting a region having a probability equal to or higher than a predetermined probability from the probability distribution image; and selecting a representative point in the region having a probability equal to or higher than the predetermined probability.

6. The welding support device according to claim 5, wherein the camera image is an image obtained by imaging, by the camera, a molten pool and an arc generated at a groove formed between two members to be welded by an arc welding, and wherein the probability distribution image a includes feature region corresponding to a feature point of the arc and a feature region corresponding to a feature point of the molten pool.

7. The learning device according to claim 2, wherein the method of generating the trained model includes setting a visible flag indicating whether a feature point is visible as the teacher data, and when the feature point is invisible, generating the trained model includes generating the learned model so as to output the probability distribution image that does not include the feature region corresponding to the feature point.

* * * * *